United States Patent [19]
Miller et al.

[11] Patent Number: 5,355,735
[45] Date of Patent: Oct. 18, 1994

[54] APPARATUS FOR METERING LIQUID FLOW

[75] Inventors: Mark E. Miller, Vancouver; Ronald W. Evans, Delta, both of Canada

[73] Assignee: Datrend Systems Inc., British Columbia, Canada

[21] Appl. No.: 21,511

[22] Filed: Feb. 23, 1993

[51] Int. Cl.⁵ .............................................. G01F 1/708
[52] U.S. Cl. ................................................. 73/861.05
[58] Field of Search .................. 73/861.05; 250/222.1

[56] References Cited

U.S. PATENT DOCUMENTS

| | | | |
|---|---|---|---|
| 3,403,555 | 10/1968 | Versaci et al. | 73/194 |
| 3,621,715 | 11/1971 | Söderkvist et al. | 73/194 E |
| 3,688,574 | 9/1972 | Arutunian et al. | 73/194 E |
| 3,693,436 | 9/1972 | Gildner | 73/194 E |
| 3,739,636 | 6/1973 | Versaci et al. | 73/194 E |
| 3,970,097 | 7/1976 | Voellmy et al. | 73/861.05 X |
| 4,210,809 | 7/1980 | Pelavin | 250/343 |
| 4,559,831 | 12/1985 | Prestele | 73/861.05 |
| 5,170,438 | 12/1992 | Anger et al. | 73/861.05 X |

FOREIGN PATENT DOCUMENTS

| | | | |
|---|---|---|---|
| 2083612 | 3/1982 | United Kingdom | 73/861.05 |
| 2256478 | 12/1992 | United Kingdom | 73/861.05 |

Primary Examiner—Herbert Goldstein

[57] ABSTRACT

An apparatus for measuring the flow of a liquid through a conduit by observing the transit of an injected gas bubble through the conduit. A gas source, responsive to the pressure of the liquid in the conduit, supplies gas at a predetermined pressure to a gas injector. This allows the gas injectors to inject a predetermined volume of gas into the conduit, largely independent of the absolute pressure of the liquid. An image, produces a conduit image representative of the gas bubble and the liquid in the conduit, comprising a plurality of elements corresponding to a plurality of predetermined locations along the conduit. A timer responsive to the conduit image produces a plurality of transit times substantially equal to the times required for the gas bubble to transit between adjacent predetermined locations. A time analyzer and indicator are included for analyzing the plurality of transit times and indicating the flow of the liquid through the conduit. An image analyzer is also included for analyzing the conduit image to initiate gas bubble injection in response to abnormal conditions. Advantageously, the apparatus may be used as disclosed herein to accurately meter irregular or pulsatile liquid flows.

10 Claims, 3 Drawing Sheets

APPARATUS FOR METERING LIQUID FLOW

FIELD OF THE INVENTION

This invention relates to apparatus for metering the flow of a liquid through a conduit by measuring the time required for a tracer introduced into the liquid to travel a fixed distance along the conduit. In particular, the invention relates to improved apparatus for metering liquid flow through a conduit by timing the passage of a gas bubble between at least one pair of positions located a predetermined distance apart along the conduit, the liquid being subjected to a variable pressure which may either oppose or assist the flow. The invention also relates to improved apparatus for metering irregular liquid flow through observation of an image of the gas bubble in an image of the conduit as the gas bubble transits the length of the conduit.

BACKGROUND OF THE INVENTION

This invention pertains to apparatus for metering the flow of a liquid through a conduit by introducing a gas bubble into the liquid stream and timing the passage of the gas bubble between two points located a predetermined distance apart along the conduit. Such flow meters have found application in liquid chromatographs, fuel systems, laboratory instruments, and medical devices where small liquid flows on the order of one milliliter per minute are typically encountered. Devices employing related principles have been proposed for measuring small liquid volumes in similar applications.

An important criterion for the proper operation of such flow meters is that the gas bubble introduced into the conduit should have a diameter substantially equal to the inside diameter of the conduit, thus completely dividing the liquid into two segments separated by the gas bubble. If the diameter of the gas bubble is less than the inside diameter of the conduit, the bubble may not flow through the conduit at the same rate as the liquid and may furthermore become attached to the wall of the conduit, requiring the user to manually flush the apparatus to release the bubble. Consequently, a gas pressure must be developed which is great enough to introduce a gas bubble of sufficient volume into the conduit against the opposing pressure of the liquid. This requirement is complicated by the fact that the pressure of the liquid within the conduit may be substantially different from the pressure of the surrounding atmosphere due to flow restrictions, changes in elevation of the liquid, and deliberately applied pressures or vacuums, some or all of which may be encountered by the liquid downstream of the flow meter.

Mechanisms for introducing the gas bubble into flow meters of the prior art have included manually-operated syringes, stop cocks, and three-way valves of predetermined interior volume; gas pumps; fluidic amplifiers; and electrodes for producing gas by electrolysis. Manually-operated syringes can develop sufficient gas pressure but require substantial operator skill when injecting a predetermined volume of gas into the conduit and are furthermore unsuited to applications requiring fully-automated metering. Stop cocks and three-way valves similar to the valve described by Gildner in U.S. Pat. No. 3,693,436 may not introduce a gas bubble of sufficient volume if the pressure of the liquid in the conduit equals or exceeds the gas pressure within the supply tank to which the valve is connected. On the other hand, active mechanisms such as gas pumps and fluidic amplifiers may readily produce a gas pressure substantially greater than that of the liquid, causing the gas bubble to disintegrate into a number of smaller segments upon introduction into the conduit. Approaches relying on electrolysis of the liquid to produce gas, such as the in method disclosed by Prestele in U.S. Pat. No. 4,559,831, are limited to very low flow rates through small diameter conduits, and are applicable only to electrolytic fluids. Although these devices may be adapted to operate at a specific liquid pressure, the applicants are unaware of any transit time flow meter of the prior art which introduces a gas bubble of predetermined volume into the conduit independently of the pressure of the liquid in the conduit.

Once a gas bubble of sufficient volume has been introduced into the conduit, the time required for the gas bubble to transit between two positions located a predetermined distance apart along the conduit is measured and may either be displayed directly or may be used to derive an indication of the flow of the liquid through the conduit. Several prior art flow meters have incorporated an optically transparent conduit with two or more bubble detectors located outside the conduit, each detector comprising a light emitting device and an opposing light sensing device which detects the change in optical transmittance between light emitter and light sensor resulting from the passage of the trailing interface between the gas bubble and the liquid. Prestele, in U.S. Pat. No. 4,559,831, discloses apparatus in which the bubble is sensed by a pair of spaced electrodes, the electrical resistance between the electrodes being higher if the bubble is between the electrodes and lower otherwise. Prior art flow meters which employ only a limited number of such bubble detectors or electrodes positioned at considerable intervals along the conduit do not provide any means for producing an image representative of the gas bubble and the liquid within the conduit. Prior art flow meters which lack such conduit imaging means are limited in their ability to control the volume of the gas injected into the conduit through direct observation of the gas in the conduit. Similarly, such flow meters are limited in their ability to detect disintegration of the gas bubble arising from irregular or pulsatile liquid flow when the gas bubble is in between bubble detectors. Flow meters which do not incorporate conduit imaging means may furthermore be sensitive to small, artifactual gas bubbles suspended within the liquid and carried by the flow into the conduit. Another limitation of such flow meters is that in order to qualitatively observe the flow of the liquid, the user must physically view the conduit and the gas bubble within it, which requires that the user be at the location of the conduit.

Flow meters which employ the transit time of a gas bubble between two locations have traditionally been used in liquid chromatographs and other laboratory instrumentation in which the flows are substantially constant as maintained by a laboratory-quality pumping device. However, in other pump metering applications, restrictions to the flow of the liquid and pressures applied to the liquid from other sources downstream may, depending on the magnitude and effect of these pressures on the pump, cause the flow to be highly varied. The mechanism of the pump may also produce a preset flow by dispensing the liquid in rapidly-delivered boluses, each bolus having a small, predetermined volume and the time between each bolus delivery thereby determining the flow. Flow meters of the prior art as described may react to such flow conditions by producing erratic indications which are difficult for the user to interpret. Such flow meters can be made to average irregular flows by employing a conduit of larger volume. However, this proportionally increases the measurement time and reduces responsivity of the flow meter to smaller flow perturbations under more continuous flow conditions.

To overcome the some of the limitations of prior art devices, an object of the present invention is to provide apparatus for metering liquid flow which is based upon the transit time of a gas bubble between at least two locations along a conduit, incorporating a pressure sensor which produces a signal proportional to the pressure of the liquid in the conduit, and a pressure generator which responds proportionally to the signal to supply gas at a predetermined pressure to a gas injector. The predetermined pressure is sufficient to allow the gas injector to inject a predetermined volume of gas into the conduit to form a gas bubble which always separates the liquid into two segments, largely independent of the absolute pressure of the liquid in the conduit.

A further object of the invention is to provide apparatus for metering liquid flow, including an imaging sensor array for producing a conduit image representative of the gas and the liquid in the conduit of a bubble transit flow meter, the conduit image comprising a number of elements which form an image of the liquid and at least one element which forms an image of the gas bubble. The apparatus also includes an image processor which analyzes the conduit image to control the introduction of gas into the conduit. Related objects of the invention provide means for injecting a predetermined volume of gas into the conduit, and means for injecting a second gas bubble when a first gas bubble introduced into the conduit is disrupted by irregular flow, or if small gas artifacts are detected within the conduit. A further related object of the invention provides means for displaying the conduit image on an array of visible indicators, thereby allowing the user to qualitatively observe the movement of the gas bubble within the conduit without having to physically view the conduit.

Another object of the invention is to provide apparatus for accurately metering irregular liquid flow, including an imaging sensor array for producing a conduit image as above, a timer for producing a number of transit times obtained from the conduit image, and a transit time analyzer for processing the transit times produced by the timer. A related object provides an algorithm executed by the time analyzer which variably and automatically averages the transit times depending on the variance of the transit time data. Advantageously, this algorithm does not substantially increase the measurement time or reduce responsivity of the apparatus to smaller flow perturbations under more continuous flow conditions.

The applicants are aware of the following United States Patents which are more or less relevant to the subject matter of the applicants' invention.

| | | | |
|---|---|---|---|
| 3,693,436 | 09/1972 | Gildner | 73/194 E |
| 4,559,831 | 12/1985 | Prestele | 73/861.05 |
| 3,403,555 | 10/1968 | Versaci et al. | 73/194 |
| 4,210,809 | 07/1980 | Pelavin | 250/343 |
| 3,688,574 | 09/1972 | Arutunian et al. | 73/194 E |
| 3,621,715 | 11/1971 | Soderkvist et al. | 73/194 E |
| -continued | | | |
| 3,739,636 | 06/1973 | Versaci et al. | 73/194 E |

SUMMARY OF THE INVENTION

The invention is directed toward apparatus for metering liquid flow, comprising: a conduit for conducting a liquid from an input port to an output port; gas injecting means for injecting a volume of gas into the liquid in the conduit; pressure sensing means for producing a fluid pressure signal representative of the pressure of the liquid within the conduit; gas supplying means responsive to the fluid pressure signal for supplying gas at a predetermined pressure to the gas injecting means; and indicating means responsive to the time required for the volume of gas to transit between at least one pair of positions located a predetermined distance apart along the conduit for indicating the flow of the liquid through the conduit. The predetermined pressure is sufficient to allow the gas injecting means to inject a predetermined volume of gas into the conduit to form a gas bubble having diameter substantially equal to the inside diameter of the conduit, thereby dividing the liquid into two segments separated by the gas bubble.

The invention is further directed toward apparatus for metering liquid flow, comprising: a conduit for conducting a liquid from an input port to an output port; gas injecting means responsive to a gas injection signal for injecting a volume of gas into the liquid in the conduit; imaging means for producing a conduit image representative of gas and liquid in the conduit, comprising a plurality of elements corresponding to a plurality of predetermined locations along the conduit, the plurality of elements comprising a liquid image comprising a first plurality of elements and a gas image comprising at least one element; image analyzing means responsive to the conduit image for producing the gas injection signal; timing means responsive to the conduit image for producing a transit time; and indicating means responsive to the transit time for indicating the flow of the liquid through the conduit. The transit time may be substantially equal to the time required for an element of the liquid image to displace an element of the gas image, the element of the liquid image and the element of the gas image being adjacent, or alternatively, the transit time may be substantially equal to the time required for an element of the gas image to displace an element of the liquid image, the element of the gas image and the element of the liquid image being adjacent. The image analyzing means may produce the gas injection signal so that a predetermined volume of gas is injected into the conduit, wherein the predetermined volume is sufficient to form a gas bubble having diameter substantially equal to the inside diameter of the conduit, and wherein the predetermined volume is sufficient to form a gas image comprising a predetermined number of adjoining elements. The image analyzing means may also produce the gas injection signal if the gas image is divided into a plurality of segments separated by an element of the liquid image.

The invention is further directed toward apparatus for metering irregular liquid flow, comprising: a conduit for conducting a liquid from an input port to an output port; gas injecting means for injecting a volume of gas into the liquid in the conduit; imaging means for producing a conduit image representative of gas and liquid in the conduit, comprising a plurality of elements corresponding to a plurality of predetermined locations along the conduit, the plurality of elements comprising a liquid image comprising a first plurality of elements and a gas image comprising at least one element; timing means responsive to the conduit image for producing a plurality of transit times; time analyzing means for analyzing the plurality of transit times to produce a processed transit time; and indicating means responsive to the processed transit time for indicating the flow of the liquid through the conduit. The plurality of transit times may comprise transit times substantially equal to the times required for an element of the liquid image to displace an element of the gas image, the element of the liquid image and the element of the gas image being adjacent, and the plurality of transit times may include transit times substantially equal to the times required for an element of the gas image to displace an element of the liquid image, the element of the gas image and the element of the liquid image being adjacent. The time analyzing means may produce the processed transit time by computing a function which comprises a plurality of selected transit times selected from the plurality of transit times, the selected transit times being selected by means of an algorithm executed by the time analyzing means.

DESCRIPTION OF THE PREFERRED EMBODIMENT

The embodiment illustrated herein is not intended to be exhaustive or to limit the invention to the precise form disclosed. It is chosen and described in order to explain the principles of the invention and its application and practical use, and thereby enable others skilled in the art to utilize the invention.

Figure 1:
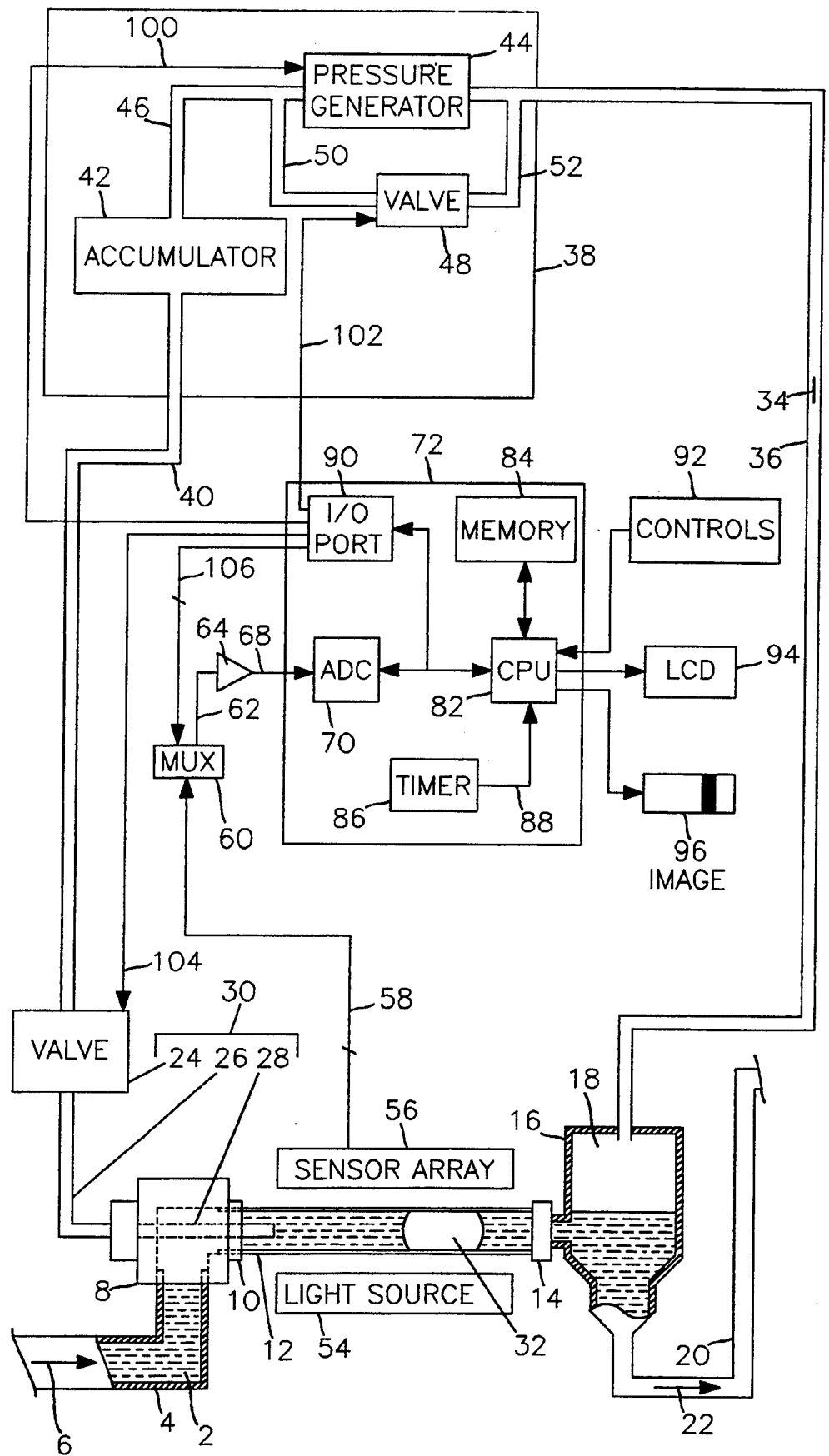
FIG. 1 is a schematic block diagram illustrating the preferred embodiment of the invention.

Referring to FIG. 1, liquid 2, the flow of which is to be metered, flows via tubing 4 in the direction of arrow 6 to machined block 8. Block 8 conveys liquid 2 to input port 10 and transparent glass conduit 12. Conduit 12 conducts liquid 2 from input port 10 to output port 14 which connects to reservoir 16. As shown, reservoir 16 is partly filled with liquid 2 and partly filled with gas 18. Liquid 2 drains from reservoir 16 and exits via tubing 20, flowing in the direction of arrow 22. Reservoir 16 also acts as a pressure sensing means for producing a fluid pressure signal 34 representative of the pressure of liquid 2 within conduit 12 as described below under operation of the invention.

Solenoid valve 24, tubing 26, and blunt-tipped needle 28 comprise gas injecting means 30 for injecting a volume of gas into liquid 2 in conduit 12, the volume of gas appearing in FIG. 1 as gas bubble 32. Gas injecting means 30 connects to gas supplying means 38 via tubing 40. Gas supplying means 38, responsive to fluid pressure signal 34 as conveyed from reservoir 16 by tubing 36, supplies gas at a predetermined pressure to gas injecting means 30. Gas supplying means 38 comprises accumulator 42 which is pressurized by pressure generator 44 via tubing 46, and solenoid valve 48, which is connected to accumulator 42 by tubing 50 and to pressure generator 44 by tubing 52. Valve 48 is arranged to be normally open, and so equalizes the pressure in accumulator 42 with fluid pressure signal 34 when it is de-energized and blocks the path from tubing 52 to tubing 50 when it is energized.

Illumination source 54 and imaging sensor array 56 are located outside conduit 12 parallel to the longitudinal axis of conduit 12. Imaging sensor array 56 produces a plurality of currents 58 which are communicated to analog multiplexer 60. Multiplexer 60 produces selected current 62 which is processed by signal conditioner 64 before being conveyed as image signal 68 to analog-to-digital converter 70 of microcontroller 72.

Figure 2:
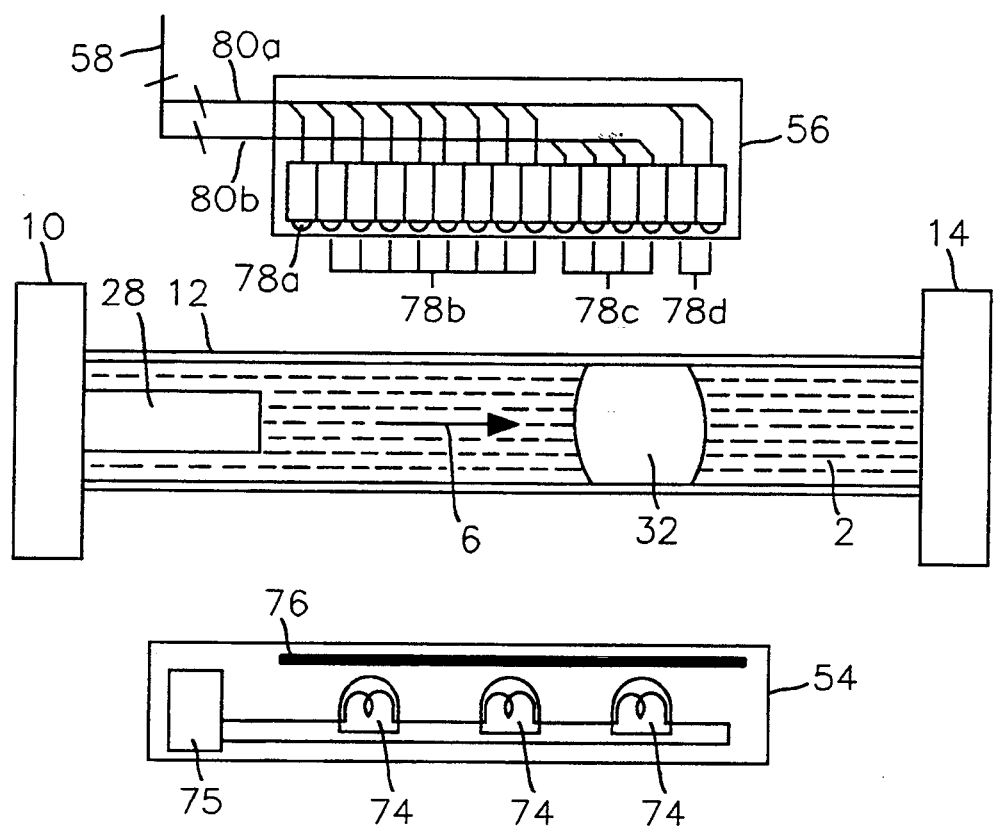
FIG. 2 is a schematic illustration of the illumination source and imaging sensor array of the invention.

FIG. 2 is a schematic illustration of the components which form illumination source 54 and imaging sensor array 56. In the preferred embodiment, illumination source 54 is comprised of three miniature incandescent lamps 74 which are energized by voltage regulator 75. Transparent diffuser 76 scatters the visible light emitted by lamps 74 so that source 54 produces a substantially uniform illumination of conduit 12 along its length. Imaging sensor array 56, comprising sixteen phototransistors 78a, 78b, 78c and 78d, is aligned with illumination source 54 so that each phototransistor 78a, 78b, 78c or 78d receives visible light from illumination source 54 directly opposite, the light intensity being modulated by the intervening conduit 12 and liquid 2. As indicated by FIG. 2, the plurality of currents 58 is comprised of collector currents 80a and 80b from phototransistors 78a, 78b, 78c and 78d. If conduit 12 contains liquid 2 and gas bubble 32 as shown in FIG. 2, phototransistors 78a, 78b, and 78d will produce predetermined collector currents 80a and phototransistors 78c will produce collector currents 80b substantially less than currents 80a due to refraction of light from source 54 by conduit 12 in the absence of liquid 2.

Referring now to FIG. 1, microcontroller 72 incorporates selected components of the preferred embodiment into a single integrated circuit. These components include analog-to-digital converter (ADC) 70 which converts image signal 68 to digital representation; central processing unit (CPU) 82 which executes a sequence of instructions according to the program stored in memory 84; timer 86 which communicates timer count 88 to CPU 82; and input-output port (I/O port) 90 which conveys control signals from CPU 82 to external devices. Microcontroller 72 receives input from the user via user controls 92 and communicates with liquid crystal display (LCD) 94 and conduit image display 96 to indicate the flow of liquid 2 through conduit 12. Referring to the pictorial representation of FIG. 3, image display 96 is comprised of sixteen rectangular light emitting diodes 98a and 98b arranged in a linear array as shown.

Referring now to FIG. 1, CPU 82 of microcontroller 72 outputs via I/O port 90 pressurize signal 100 to pressure generator 44 to increase the gas pressure in accumulator 42. To prevent liquid pressure signal 34 from reaching accumulator 42, microcontroller 72 asserts shutoff signal 102 to activate valve 48. Microcontroller 72 also outputs gas injection signal 104 to valve 24 of gas injecting means 30. Valve 24 is arranged to be normally-closed so that assertion of gas injection signal 104 will cause gas injecting means 30 to inject gas bubble 32 into conduit 12. Microcontroller 72 also produces current selector signal 106, which causes multiplexer 60 to select current 62 from the plurality of currents 58 for processing by signal conditioner 64.

Figure 4:
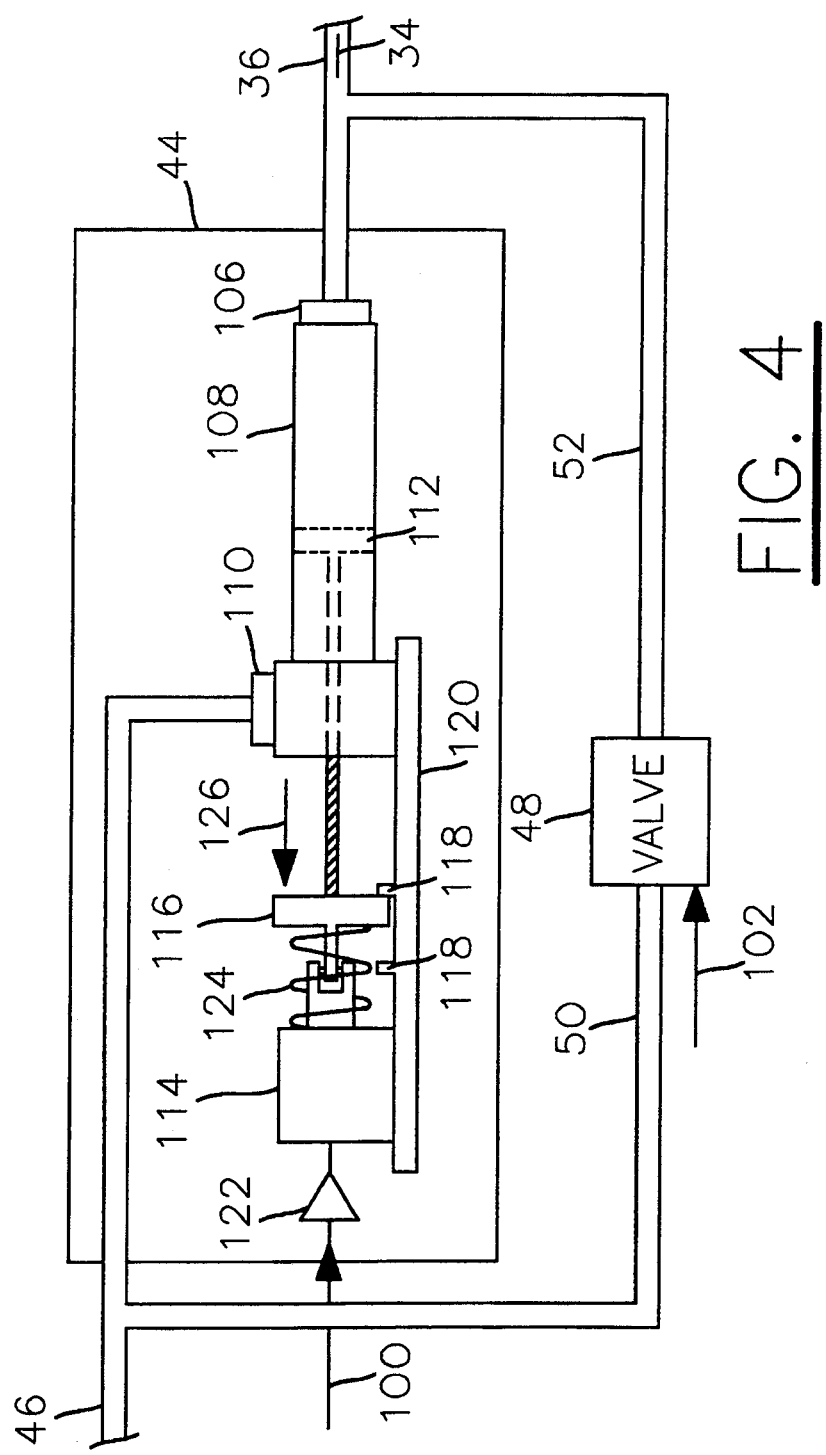
FIG. 4 is a schematic illustration of the pressure generator of the invention.

FIG. 4 schematically illustrates the preferred embodiment of pressure generator 44. Liquid pressure signal 34 enters pressure generator 44 by means of tubing 36 which connects to port 106 of miniature double-acting cylinder 108. The output of pressure generator 44 is taken from port 110 of cylinder 108 which connects to tubing 46. Piston 112 of cylinder 108 is attached to solenoid 114 by means of threaded collar 116. The stroke of piston 112 is limited by stops 118 on base 120, which also serves to mount cylinder 108 and solenoid 114. Solenoid 114 is energized by power amplifier 122 which amplifies pressurize signal 100 from microcontroller 72 shown in FIG. 1. Referring to FIG. 4, spring 124 is used to return piston 112 to the position shown when solenoid 114 is de-energized.

A working model of the preferred embodiment of the invention can be assembled according to FIGS. 1, 2, 3 and 4 by persons skilled in the art using the following components: valves 24 and 48 can each be LFAA1200110H manufactured by The Lee Co. of Westbrook Conn.; needle 28 can be a KDS14-1/2P manufactured by Kahnetics Dispensing Systems of Bloomington Calif.; microcontroller 72 can be a HD6475328CP10 supplied by Hitachi America Ltd. of Brisbane Calif.; miniature lamps 74 can each be CM 683 manufactured by General Instrument Corp. of Palo Alto Calif.; phototransistors 78a, 78b, 78c and 78d can each be OP509A manufactured by Optek Technology of Carrollton Tex.; LCD 94 can be a AND 711AST, supplied by AND, W. J. Purdy Co. of Burlingame Calif.; light-emitting diodes 98a and 98b can each be HLMP0301 manufactured by Three-Five Systems Inc. of Phoenix Ariz.; cylinder 108 can be a SDR-05-1/2 manufactured by Clippard Instrument Laboratory of Cincinnati Ohio; and solenoid 114 can be a No. 11HD manufactured by Guardian Electric Manufacturing Co. of Chicago Ill. In a working model so constituted, phototransistors 78a, 78b, 78c and 78d as specified can be optionally located side-by-side so that the spacing between phototransistors is 0.065 inches. Thereby, imaging sensor array 56 may be configured to image a length of 0.975 inches (2.5 centimeters) along conduit 12. If conduit 12 is a glass capillary tube with 3.3 millimeter inside diameter, this length corresponds to a conduit volume of 0.21 milliliters. In this case, phototransistors 78a, 78b, 78c and 78d demarcate sixteen locations along conduit 12, each pair of locations bounding one-fifteenth of the conduit volume, or 0.014 milliliters. These dimensions as defined permit the working model of the preferred embodiment to meter flows over the range of 0.1 to 200 milliliters per hour, other flow ranges being accommodated by altering the inside diameter of conduit 12 and the spacing of phototransistors 78a, 78b, 78c and 78d as required.

Referring to FIG. 1, the apparatus for metering the flow of liquid 2 operates in the following manner. Liquid 2 is presumed to be supplied by a pumping device or elevated reservoir (not shown) which is upstream of the apparatus and which causes liquid 2 to flow in the direction of arrow 6. Liquid 2 exits the apparatus via tubing 20, which may present significant resistance to the flow of liquid 2 depending on the length and diameter of tubing 20 and the velocity of liquid 2. The flow resistance of tubing 20 develops a back pressure opposing the flow which is applied to liquid 2 in conduit 12. Liquid 2 may also undergo a change in elevation by means of tubing 20, which, according to the example of FIG. 1, would increase the opposing back pressure. Additionally, there may be other flow restrictions or sources of pressure located downstream outside the bounds of the apparatus herein described which could act upon liquid 2. Consequently, the pressure of liquid 2 in conduit 12 may be substantially and arbitrarily different from the pressure of the surrounding atmosphere so that flow through conduit 12 may either be opposed or assisted. Depending on the fluid pressure so generated, the level of liquid 2 will rise or fall in reservoir 16, compressing or expanding gas 18 until the pressure of gas 18 is substantially equal to the pressure of liquid 2 in conduit 12. The pressure of gas 18 is output from reservoir 16 by means of tubing 36, reservoir 16 thereby providing pressure sensing means for producing fluid pressure signal 34 representative of the pressure of liquid 2 within conduit 12. Fluid pressure signal 34 is communicated to accumulator 42 via tubing 36, 46, 50 and 52 and open valve 48 so that the gas pressure within accumulator 42 is initially equalized with fluid pressure signal 34.

The user commands microcontroller 72 to begin metering the flow of liquid 2 by means of user controls 92. Microcontroller 72 responds to the user's command by first asserting shutoff signal 102 and by asserting pressurize signal 100 a few milliseconds later. Shutoff signal 102 energizes valve 48 to block the path of fluid pressure signal 34 to accumulator 42. Referring to FIG. 4, pressurize signal 100 activates solenoid 114, causing piston 112 to move in the direction of arrow 126. Cylinder 108 thereby delivers a volume of gas to accumulator 42 of FIG. 1, which causes the pressure in accumulator 42 to increase. Referring now to FIG. 1, pressure generator 38 thereby amplifies fluid pressure signal 34 to produce a pressure within accumulator 42 which is greater than the pressure of liquid 2 in conduit 12. The volume of cylinder 108 and position of stops 118 on base 120 shown in FIG. 4, and the volume of accumulator 42, are preselected so that when microcontroller 72 produces pressurize signal 100, gas supplying means 38, responsive to fluid pressure signal 34, supplies gas at a predetermined pressure to gas injecting means 30 via tubing 40. Microcontroller 72 then asserts gas injection signal 104 so that gas injecting means 30 injects a volume of gas into liquid 2 in conduit 12. As developed by gas supplying means 38, the predetermined pressure is sufficient to allow gas injecting means 30 to inject a predetermined volume of gas into conduit 12, wherein the predetermined volume is sufficient to form gas bubble 32 having diameter substantially equal to the inside diameter of conduit 12, thereby dividing liquid 2 into two segments separated by gas bubble 32 as shown in FIG. 1. Advantageously, division of liquid 2 into two segments following injection of gas bubble 32 is always achieved by the disclosed apparatus and method, largely independent of the absolute pressure of liquid 2 in conduit 12. Thereby, gas bubble 32 is pushed by liquid 2 through conduit 12 at a velocity substantially equal to the flow of liquid 2 through conduit 12.

In a working model of the preferred embodiment of the invention comprising the specific components identified previously, accumulator 42 is designed to have a volume of 8.0 milliliters and reservoir 16 is designed to have a volume of 250 milliliters, approximately 230 milliliters of which is filled by gas 18. The volume of reservoir 16 is advantageously preselected to be much larger than the predetermined volume of gas bubble 32 so that fluid pressure signal 34 is substantially unaffected when gas bubble 32 is injected into conduit 12. Referring to FIG. 4, base 120 is designed so that stops 118 limit the stroke of piston 112 to 4.2 millimeters. Thus, cylinder 108 outputs 0.2 milliliters of gas to accumulator 42 of FIG. 1 when pressurize signal 100 is asserted. Referring to FIG. 1, gas supplying means 38 thereby supplies gas at a predetermined pressure of 20 to 30 mmHg above the pressure of liquid 2 in conduit 12 to gas injecting means 30. Advantageously, this predetermined pressure is largely independent of the absolute pressure of liquid 2 over the range of 740 to 1160 mmHg. Microcontroller 72 asserts gas injection signal 104 for 40 milliseconds so that a predetermined volume of 0.13 milliliters of gas is injected into conduit 12, which is sufficient to form a cylindrical gas bubble 32 of diameter substantially equal to 3.3 millimeters and length approximately equal to 1.5 centimeters. In the preferred embodiment, the inside diameter of conduit 12 is 3.3 millimeters, and thus gas bubble 34 completely divides liquid 2 into two segments which are approximately 1.5 centimeters apart.

Following injection of gas bubble 32 into conduit 12, microcontroller 72 inhibits shutoff signal 102 which permits valve 48 to open, releasing excess gas within accumulator 42 and equalizing the pressure across pressure generator 44. Microcontroller 72 then inhibits pressurize signal 100, which, referring to FIG. 4, causes spring 124 to return piston 112 to its resting position as shown.

As described, the apparatus of FIG. 1 comprises novel means for injecting a predetermined volume of gas into conduit 12 against an unknown and arbitrary liquid pressure for use in apparatus for metering liquid flow. A flow indicator, responsive to the time required for the volume of gas to transit between at least one pair of positions located a predetermined distance apart along conduit 12, is then used for indicating the flow of liquid 2 through conduit 12. Microcomputer 72, imaging sensor array 56 and LCD 94 along with other components of FIGS. 1 and 2 are used as described below to embody a such flow indicator, this flow indicator having numerous advantages over prior art flow indicators employing only two bubble sensing devices located a predetermined distance apart along a conduit.

Continuously throughout operation of the preferred embodiment, illumination source 54, imaging sensor array 56, multiplexer 60, signal conditioner 64 and microcontroller 72 obtain a conduit image representative of gas within liquid 2 as follows. Referring to FIGS. 1 and 2, microcontroller 72 first asserts current selector signal 106 so that phototransistor 78a is connected to signal conditioner 64 by means of multiplexer 60. As described previously, selected current 62 from phototransistor 78a will be near a predetermined current if liquid 2 is within conduit 12 directly opposite the position of phototransistor 78a, and will be near a current substantially less than the predetermined current if a portion of gas bubble 32 is within conduit 12 directly opposite the position of phototransistor 78a. Selected current 62 is converted to a proportional voltage by signal conditioner 64, this proportional voltage being conveyed as image signal 68 to ADC 70. ADC 70 converts image signal 68 to digital representation, and CPU 82 compares the result of the conversion to a predetermined threshold. If image signal 68 after conversion exceeds the threshold, liquid 2 is presumed to be in conduit 12 opposite phototransistor 78a, and CPU 82 resets to binary zero the most significant bit of a corresponding 16-bit image word stored at a predefined location in memory 84. If image signal 68 after conversion does not exceed the threshold, a portion of gas bubble 32 is presumed to be in conduit 12 directly opposite phototransistor 78a, and CPU 82 sets to binary one the most significant bit of the corresponding image word in memory 84. Microcontroller 72 then asserts current selector signal 106 so that phototransistor 78b immediately adjacent to phototransistor 78a is connected to signal conditioner 64 by means of multiplexer 60. The procedure described above is repeated by CPU 82 for phototransistor 78b adjacent to phototransistor 78a, except that the second most significant bit of the corresponding image word in memory 84 is reset or set depending on the absence or presence of gas bubble 32 at the location opposite this phototransistor. This process is repeated by microcontroller 72 for all phototransistors 78a, 78b, 78c and 78d until all 16 bits of the corresponding image word in memory 84 have been set or reset as appropriate, the position of phototransistor 78a corresponding to the most significant bit of the image word as described and the position of phototransistor 78d corresponding to the least significant bit of the image word. Thus, each bit of the image word is a discrete element which corresponds one-to-one with a predefined location along conduit 12, the image so derived comprising a number of binary zeros corresponding to an image of liquid 2 and one or more binary ones corresponding to an image of gas bubble 32. For the position of gas bubble 32 in conduit 12 as shown in FIG. 2, microcontroller 72 would, by executing the above algorithm, thereby obtain a corresponding image word equal to, in binary format:

0000000000111100.

In summary, illumination source 54, imaging sensor array 56, multiplexer 60, signal conditioner 64 and microcontroller 72 comprise imaging means for producing a conduit image representative of gas within liquid 2 in conduit 12, comprising a plurality of elements corresponding to a plurality of predetermined locations along conduit 12, the plurality of elements comprising a liquid image comprising a first plurality of elements and a gas image comprising at least one element. In the preferred embodiment, microcontroller 72 continuously executes this imaging algorithm while performing other tasks so that the conduit image is recreated periodically. The numerous advantages achieved by producing such a periodic conduit image will be disclosed in following paragraphs.

Figure 3:
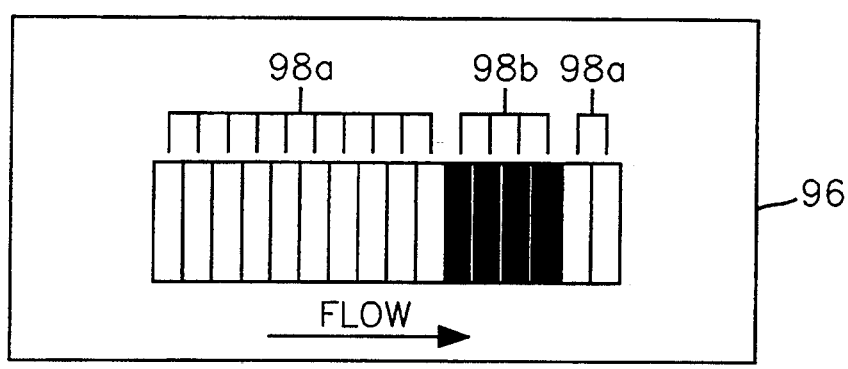
FIG. 3 is a pictorial representation of the conduit image display of the invention.

For example, referring to FIGS. 1, 2 and 3, CPU 82 samples each bit of the conduit image and causes a corresponding light-emitting diode 98a and 98b of conduit image display 96 to be energized if the bit is binary one and extinguished if the bit is binary zero. Thereby, the flow indicator of the apparatus includes a plurality of indicators corresponding to the plurality of elements of the conduit image, an indicator being visible if a corresponding element relates to the gas image. For the position of gas bubble 32 as shown in FIG. 2, CPU 82 thus causes diodes 98a to be extinguished and diodes 98b to be energized, thereby producing the visible representation of gas bubble 32 in conduit 12 shown in FIG. 3. Since the conduit image is periodically updated by microcontroller 72, the user may indirectly view the volume of gas bubble 32 and the movement of gas bubble 32 in conduit 12 without having to physically observe gas bubble 32 in conduit 12. Advantageously, the user may thus be located remotely from conduit 12 and still be able to qualitatively discern the nature of the flow of liquid 2 through conduit 12, which may be fast or slow, and which more importantly may be relatively continuous, or irregular, or even highly pulsatile. Other advantages provided by the conduit image are directly related to the quantitative derivation of liquid flow as described below.

Referring now to FIGS. 1 and 2, CPU 82, in conjunction with timer 86 of microcontroller 72, may use the periodic conduit image in a number of ways to derive the flow of liquid 2 through conduit 12. The simplest approach is best suited for relatively continuous flows. Using the method described above, gas injecting means injects a predetermined volume of gas into liquid 2 in conduit 12. Following injection, the first conduit image obtained by microcontroller 72, consisting of a gas image of binary ones and liquid image of binary zeros, would be similar to:

1111100000000000, wherein the exact number of binary ones comprising the gas image is dependent on the predetermined volume of gas bubble 32 and hence the predetermined pressure developed by gas supplying means 38 as described above. As gas bubble 32 is pushed by flowing liquid 2 through conduit 12, the conduit image, periodically updated by microcontroller 72, shifts right one bit at a time as gas bubble 32 passes each phototransistor 78a, 78b, 78c and 78d of imaging sensor array 56. In a first method of deriving the flow, CPU 82 uses timer 86 to determine the time required for the most significant binary one of the gas image to shift right one bit. For the example image given previously, CPU 82 resets timer count 88 of timer 86 to binary zero when the conduit image as periodically updated by microcontroller 72 becomes:

0111110000000000.

Such a conduit image indicates the trailing edge of gas bubble 32 has flowed past phototransistor 78a. Microcontroller 72 continues to update the conduit image, and when the conduit image becomes:

0011110000000000, indicating that the trailing edge of gas bubble 32 has flowed past phototransistor 78b adjacent to phototransistor 78a, CPU 82 reads timer count 88. CPU 82 computes the flow as the volume of conduit 12 bounded by the positions of adjacent phototransistors 78a and 78b divided by timer count 88 so obtained. This computed flow is then communicated by CPU 82 to LCD 94 for numeric display. Thereby, CPU 82 and timer 86 provide timing means responsive to the conduit image for producing a transit time, where in this case the transit time is substantially equal to the time required for an element of the liquid image to displace an element of the gas image, the element of the liquid image and the element of the gas image being adjacent. CPU 82 and LCD 94 then act as indicating means responsive to the transit time for indicating the flow of liquid 2 through conduit 12.

Following determination of the flow as described, CPU 82 resets timer 86 and reads timer count 88 when, as updated by microcontroller 72, the conduit image of the given example becomes:

0001111100000000.

CPU 82 now uses the bounded volume and timer count 88 as described above to calculate a second flow which is communicated to LCD 94. This process is repeated until the most significant bit of the gas image shifts out of the conduit image, leaving only a liquid image consisting entirely of binary zeros. At this point, microcontroller 72 initiates the sequence of shutoff signal 102, pressurize signal 100, and gas injection signal 104 as described previously to cause gas injecting means 30 to inject a predetermined volume of gas into conduit 12, thereby forming a new gas bubble (not shown) and ejecting gas bubble 32 into reservoir 16. Ejected gas bubble 32 thus replenishes gas 18 used in injecting the new gas bubble. Thereby, reservoir 16 advantageously provides a bubble trap so that liquid 2 exiting via tubing 20 is without gas bubbles.

An alternate method of determining flow is possible using the conduit image. For example, starting with an initial conduit image of:

0001111000000000,

CPU 82, using timer 86, may determine the time required for the gas image to shift to:

0001111100000000, which indicates that the leading edge of gas bubble 32 in conduit 12 has transited from the position opposite the sixth phototransistor 78b of imaging sensor array 56 to the position opposite the seventh phototransistor 78b. Thereby, CPU 82 and timer 86 provide timing means responsive to the conduit image for producing a transit time, where in this case the transit time is substantially equal to the time required for an element of the gas image to displace an element of the liquid image, the element of the gas image and the element of the liquid image being adjacent.

One advantage of obtaining the flow of liquid 2 through conduit 12 in this manner is that by using a conduit image as described, gas injecting means 30 need be operated only once to produce a multiplicity of successive flow measures using one or both of the methods disclosed above. For the preferred embodiment as described, only one gas bubble 32 need be injected to produce up to twenty-eight flow measurements as compared to a single measurement obtained by a prior art flow meter using two bubble sensors spaced a predetermined distance apart along a conduit. Other advantages of the conduit image so obtained relate to gas injecting means 30 responsive to gas injection signal 104 for injecting a volume of gas into liquid 2 in conduit 12.

CPU 82, in addition to its other functions, also provides image analyzing means responsive to the conduit image for producing gas injection signal 104. As described previously, the apparatus of FIG. 1 produces gas bubble 32 in conduit 12 by first supplying gas at a predetermined pressure from gas supplying means 38 to gas injection means 30. When gas injection signal 104 is asserted by microcontroller 72 for a predefined period of time, a predetermined volume of gas sufficient to form gas bubble 32 as shown in FIG. 1 is injected into conduit 12, which in practise is always greater than a predetermined minimum volume if the absolute pressure of liquid 2 in conduit 12 lies within a specified range. While microcontroller 72 is producing gas injection signal 104, CPU 82 analyzes the conduit image obtained concurrently by microcontroller 72. CPU 82 allows microcontroller 72 to produce gas injection signal 104 so that a predetermined volume of gas is injected into conduit 12, wherein the predetermined volume is sufficient to form gas bubble 32 having diameter substantially equal to the inside diameter of conduit 12, and wherein the predetermined volume is sufficient to produce a gas image comprising a predetermined number of adjoining elements. In this way, the apparatus of FIG. 1 advantageously acts to bound the predetermined volume of gas bubble 32 so that it always exceeds the predetermined minimum volume as set by the predetermined pressure developed by gas supplying means 38, while simultaneously not exceeding a predetermined maximum volume as indicated by the predetermined number of adjoining elements of the gas image. For example, in the working model of the preferred embodiment described previously, the apparatus of FIG. 1 will act to inject a gas bubble 32 of predetermined volume having diameter nearly equally to the inside diameter of conduit 12, which is 3.3 millimeters, and having length of 1.5 centimeters, so that the first conduit image produced following injection appears as:

1111111100000000.

CPU 82 also analyzes the conduit image to test for disruption of gas bubble 32 by highly irregular or pulsatile liquid flow through conduit 12. For example, an initial conduit image similar to:

0000111111110000 is disrupted by a sudden burst of flow of liquid 2 through conduit 12. Microcontroller 72 subsequently produces a conduit image similar to:

0000010011100011.

CPU 82 analyzes the conduit image and determines that the gas image no longer comprises adjoining elements. In response, CPU 82 produces shutoff signal 102, pressurize signal 100 and gas injection signal 104 via I/O port 90 so that a new, unbroken gas bubble (not shown) is injected into conduit 12. CPU 82 asserts gas injection signal 104 via I/O port 90 until all fragments of the broken bubble are ejected from conduit 12, thereby producing a conduit image consisting only of a gas image of adjoining binary ones and a liquid image of adjoining binary zeros. For the example given above, CPU 82 asserts gas injection signal 104 until microcomputer 72 subsequently obtains a conduit image similar to:

1111111111100000.

Thereby, CPU 82 provides image analyzing means which produces gas injection signal 104 if the gas image is divided into a plurality of segments separated by an element of the liquid image. For the methods disclosed of metering liquid flow by timing the rightward shift of the most significant bit or the least significant bit of the gas image, this response of CPU 82 to disrupted gas images advantageously prevents LCD 94 from indicating values potentially misrepresentative of the flow of liquid 2 through conduit 12. Additionally, the method is advantageous not only for recovering from periods of turbulent, erratic flow, but may also be used when small gas bubbles, suspended within liquid 2 and carried by the flow, may eventually appear in the conduit image as gas image artifacts. For example, given an initial conduit image similar to:

0000000000001111, a small artifactual gas bubble (not shown), suspended in liquid 2 and carried into conduit 12 by flow in the direction of arrow 6, may subsequently attach to the wall of conduit 12 and thereby appear in the conduit image as:

0001000000001111.

For the method described in which the rightward shift of the most significant bit of the gas image is timed, the artifact shown at the fourth most significant bit of the conduit image above will produce displays of erroneous flows via LCD 94 since the gas bubble producing the artifact is in fact stuck to the wall of conduit 12. As described previously, since the gas image is divided into a plurality of segments separated in this case by several elements of the liquid image, CPU 82 produces gas injection signal 104 via I/O port 90 until the artifactual gas bubble is ejected from conduit 12 as indicated by the conduit image. CPU 82, using timer 86, then begins timing the rightward shift of the most significant bit of the gas image in a conduit image similar to:

1111111111111000, thereby advantageously preventing display of erroneous flow measurements via LCD 94.

In many situations, the flow of liquid 2 through conduit 12 may be effected by an active pumping device located upstream of the apparatus of FIG. 1. Restrictions to the flow of liquid 2 and pressures applied to liquid 2 from other sources may, depending on the magnitude and effect of the pressures on the pumping device, cause the flow to be highly varied. The mechanism of the pumping device may also produce a preset flow by dispensing liquid 2 in rapidly-delivered boluses, each bolus having a small, predetermined volume and the time between each bolus delivery thereby determining the flow. Flow meters of the prior art which measure the transit time of a gas bubble tracer through a conduit may react to such flow conditions by producing erratic indications which are difficult for the user to interpret. Such flow meters can be made to average irregular flows by employing a conduit of larger volume, at the expense of increased measurement time and reduced responsivity under more continuous flow conditions. The apparatus for metering liquid flow disclosed herein, however, can be used under such irregular or pulsatile flow conditions to prevent erratic flow indications while simultaneously preserving responsivity to less extreme variations in flow. This is achieved by using the conduit image discussed previously, from which a multiplicity of data can be extracted in relation to the motion of a single gas bubble 32 through conduit 12.

The apparatus of FIG. 1 is used to meter irregular liquid flow in the following manner. As described in the preceding paragraphs, the apparatus, upon receiving an appropriate command from the user via user controls 92, injects gas bubble 32 of predetermined volume into conduit 12, gas bubble 32 being moved in the direction of arrow 6 by liquid 2 which may be flowing through conduit 12 in a non-continuous, potentially pulsatile manner. As gas bubble 32 transits the length of conduit 12, microcontroller 72 produces conduit images periodically. Using the same technique of observing the rightward shift of the most significant or least significant bit of the gas image as discussed previously, CPU 82 and timer 86 produce a plurality of transit times, the plurality of transit times comprising transit times substantially equal to the time required for an element of the liquid image to displace an element of the gas image, the element of the liquid image and the element of the gas image being adjacent. Additionally, the plurality of transit times may include transit times substantially equal to the time required for an element of the gas image to displace an element of the liquid image, the element of the gas image and the element of the liquid image being adjacent. Each transit time so obtained is stored in memory 84 by CPU 82 which analyzes the plurality of transit times to produce a processed transit time. CPU 82 then uses the processed transit time to calculate a flow representative of the flow of liquid 2 through conduit 12, communicating this flow to LCD 94 which thereby provides indicating means responsive to the processed transit time for indicating the flow of liquid 2 through conduit 12.

When CPU 82 acquires a transit time $T_i$ by executing the algorithm disclosed previously, it stores $T_i$ in memory 84 with the plurality of transit times $\{T_1, T_2, \ldots, T_{i-1}\}$ previously acquired. In the preferred embodiment, CPU 82 may collect up to fifteen such transit times to form the plurality. If CPU 82 has acquired at least two such transit times, CPU 82 then performs an analysis of the plurality of transit times which includes calculation of a function $\delta$ which is an estimate of the absolute value of the first derivative of the mean transit time normalized to the mean transit time. Function $\delta$ is thus given by:

$$\delta = \left| \frac{\frac{\sum_{i=1}^{N} T_i}{N} - \frac{\sum_{i=1}^{N-1} T_i}{N-1}}{\frac{\sum_{i=1}^{N} T_i}{N}} \right| = \left| \frac{T_i - \frac{\sum_{i=1}^{N-1} T_i}{N-1}}{T_1 + \sum_{i=1}^{N-1} T_i} \right|, 2 \leq N \leq 15 \quad (1)$$

where $T_i$ are the transit times acquired by the apparatus by timing the rightward shift of the most significant bit of the gas image produced by single injected gas bubble 32, and N is the number of transit times acquired up to time $T_i$. If $\delta$ given by (1) is less than a predetermined threshold, CPU 82 calculates the flow of liquid 2 through conduit 12 as:

$$\text{FLOW} = \frac{N * V_0}{\sum_{i=1}^{N} T_i} \quad (2)$$

where $V_o$ is a base transit volume substantially equal to the volume of conduit 12 bounded by the positions of adjacent phototransistors 78a and 78b of FIG. 2. CPU 82 communicates the flow obtained from equation (2) to LCD 94 for display. CPU 82 then clears the plurality of transit times from memory 84 and restarts the analysis by acquiring transit time $T_1$. If the number of transit times equals or exceeds N=15, CPU 82 computes equation (2) with transit times $\{T_1, T_2, \ldots, T_{15}\}$, displays the resulting flow via LCD 94, clears memory 84, and restarts the analysis as above. As with the previous method of metering liquid flow, when the gas image shifts out of the conduit image leaving only a liquid image, microcontroller 72 activates gas supplying means 38 and gas injecting means 30 to inject a new gas bubble of predetermined volume into conduit 12.

Equation (2) is identically the average flow of liquid 2 through conduit 12 computed over N transit times. N is selected by CPU 82 based on the analysis implicit in equation (1), which provides a measure of the variation of the flow based on transit times acquired from a single injected gas bubble 32. If the flow of liquid 2 is substantially constant, $\delta$ will be nearly zero at N=2, and thus the flow will be averaged according to equation (2) over two transit times $T_1$ and $T_2$. In this case, the apparatus does not heavily average the transit time data and thereby retains its responsiveness to small perturbations in flow, advantageously reporting a higher number of flows via LCD 94. If, however, the flow of liquid 2 is irregular or pulsatile, $\delta$ as obtained by CPU 82 using equation (1) will initially be substantially unequal to zero. This will prevent CPU 82 from computing and reporting the flow to the user via LCD 94. As a greater number of transit times are acquired by the apparatus, each acquired transit time $T_i$ will have less influence on the sample means computed according to equation (1), and thus $\delta$ will approach zero at a rate which is related to the variance of the plurality of transit times $\{T_1, T_2, \ldots, T_i\}$. Eventually, $\delta$ will either fall below the predetermined threshold or fifteen transit times will be acquired, and CPU 82 will use equation (2) to compute the flow averaged over the number of transit times N, N being advantageously greater for flows exhibiting greater variance. Because the apparatus as described produces an image of gas bubble 32 in conduit 12, this analysis may be advantageously conducted for each gas bubble injected into conduit 12.

In summary, CPU 82 as described provides time analyzing means for analyzing the plurality of transit times for producing a processed transit time. CPU 82 produces the processed transit time by computing a function which comprises a plurality of selected transit times selected from the plurality of transit times $\{T_1, T_2, \ldots, T_{15}\}$. This processed transit time appears in the denominator of equation (2), the denominator so expressed being a sum of the plurality of selected transit times $\{T_1, T_2, \ldots, T_N\}$, where N is less than or equal to 15. The plurality of selected transit times are selected by means of an algorithm executed by CPU 82, comprising the steps of: storing the plurality of transit times in a memory; computing a value of the equation (1) which is equal to the absolute value of an estimate of the first derivative of the mean of a plurality of preselected transit times, the first derivative being normalized to the mean; comparing the value to a predetermined threshold; and declaring the plurality of preselected transit times to be the plurality of selected transit times if the value is less than the predetermined threshold. Advantageously, these features allow the apparatus of FIG. 1 to accurately meter irregular liquid flows, automatically and independently imposing a greater degree of averaging for flows exhibiting a greater degree of variation. This is achieved through use of an image representative of gas bubble 32 and liquid 2 in conduit 12, which advantageously permits this averaging algorithm to be applied at the same time gas bubble 32 is in transit through conduit 12.

Novel apparatus for metering liquid flow that provides improved flow measurement of liquids under conditions of irregular flow and opposing or assisting liquid pressures has been described. It is evident that given the preceding description of the preferred embodiment, persons skilled in the art can now make numerous uses of, modifications of, and departures from the preferred embodiment disclosed herein without departing from the principles of the invention. For example, referring to FIG. 1, it would be apparent to persons skilled in the art that pressure supplying means 38, responsive to fluid pressure signal 34, may be implemented using a number of alternate means comprising a pressure source such as an air pump, an accumulator or air reservoir, and a means for sensing the pressure of the air within the accumulator and the pressure of liquid 2 within conduit 12. Such pressure sensors commonly incorporate piezoresistive strain gauges for transducing an applied pressure to an electrical signal. It should furthermore be apparent to persons skilled in the art that many modifications of the imaging means for producing the conduit image are possible, such as increasing or decreasing the number of constituent elements, and substituting other means for detecting the position of gas bubble 32 within conduit 12, both optically and non-optically. Given the above explanation of the method used in obtaining and processing a plurality of transit times for metering irregular liquid flow, it should also be apparent to persons skilled in the art that many other functions and processing algorithms are possible in addition to those disclosed above. In light of the foregoing and other examples, the invention is therefore not to be limited to the details herein given, but may be modified within the scope of the appended claims.

We claim:

1. Apparatus for metering liquid flow, comprising:
   (a) a conduit for conducting a liquid from an input port to an output port;
   (b) gas injecting means for injecting a volume of gas into the liquid in the conduit;
   (c) pressure sensing means for producing a fluid pressure signal representative of the pressure of the liquid within the conduit;
   (d) gas supplying means responsive to the fluid pressure signal for supplying gas at a predetermined pressure to the gas injecting means; and
   (e) indicating means responsive to the time required for the volume of gas to transit between at least one pair of positions located a predetermined distance apart along the conduit for indicating the flow of the liquid through the conduit.

2. Apparatus as defined in claim 1 wherein the predetermined pressure is sufficient to allow the gas injecting means to inject a predetermined volume of gas into the conduit.

3. Apparatus as defined in claim 2 wherein the predetermined volume is sufficient to form a gas bubble having diameter substantially equal to the inside diameter of the conduit, thereby dividing the liquid into two segments separated by the gas bubble.

4. Apparatus for metering liquid flow, comprising:
   (a) a conduit for conducting a liquid from an input port to an output port;
   (b) gas injecting means responsive to a gas injection signal for injecting a volume of gas into the liquid in the conduit;
   (c) imaging means for producing a series of conduit images representative of gas and liquid in the conduit observed at successive instants in time, wherein each conduit image consists of a plurality of elements corresponding to a plurality of predetermined locations along the conduit, and wherein the plurality of elements comprises a plurality of liquid image elements and at least one gas image element;
   (d) image analyzing means responsive to the series of conduit images for producing the gas injection signal so that a predetermined volume of gas is injected into the conduit;
   (e) timing means responsive to the series of conduit images for producing a transit time; and
   (f) indicating means responsive to the transit time for indicating the flow of the liquid through the conduit.

5. Apparatus as defined in claim 4, wherein the predetermined volume is sufficient to form a gas bubble having diameter substantially equal to the inside diameter of the conduit, and wherein the predetermined volume is sufficient to produce a predetermined number of adjoining gas image elements.

6. Apparatus as defined in claim 5, wherein the image analyzing means produces the gas injection signal if the gas image elements are separated by a liquid image element.

7. Apparatus as defined in claim 4, wherein the indicating means includes a plurality of indicators corresponding to the plurality of elements, an indicator being visible if a corresponding element is a gas image element.

8. Apparatus for metering irregular liquid flow, comprising:
   (a) a conduit for conducting a liquid from an input port to an output port;
   (b) gas injecting means for injecting a volume of gas into the liquid in the conduit;
   (c) imaging means for producing a series of conduit images representative of gas and liquid in the conduit observed at successive instants in time, wherein each conduit image consists of a plurality of elements corresponding to a plurality of predetermined locations along the conduit, and wherein the plurality of elements comprises a plurality of liquid image elements and at least one gas image element;
   (d) timing means responsive to the conduit images for producing a plurality of transit times;
   (e) time analyzing means for selecting transit times from the plurality of transit times and producing a processed transit time; and
   (f) indicating means responsive to the processed transit time for indicating the flow of the liquid through the conduit.

9. Apparatus as defined in claim 8, wherein the processed transit time is a sum of transit times selected from the plurality of transit times.

10. Apparatus as defined in claim 8, wherein transit times are selected by means of an algorithm executed by the time analyzing means, comprising the steps of:

storing a plurality of transit times in a memory;

computing a value of an equation which is equal to the absolute value of an estimate of the first derivative of the mean of the plurality of transit times, the first derivative being normalized to the mean;

comparing the value to a predetermined threshold; and selecting the plurality of transit times for use in derivation of the processed transit time if the value is less than the predetermined threshold.

* * * * *